US012378076B2

(12) United States Patent
Oshiro et al.

(10) Patent No.: US 12,378,076 B2
(45) Date of Patent: Aug. 5, 2025

(54) TRANSPORT SYSTEM AND TRANSPORT ROBOT

(71) Applicant: OMRON Corporation, Kyoto (JP)

(72) Inventors: Atsushi Oshiro, Kyoto (JP); Tomonori Manome, Kyoto (JP)

(73) Assignee: OMRON Corporation, Kyoto (JP)

( * ) Notice: Subject to any disclaimer, the term of this patent is extended or adjusted under 35 U.S.C. 154(b) by 609 days.

(21) Appl. No.: 17/793,039

(22) PCT Filed: Feb. 8, 2021

(86) PCT No.: PCT/JP2021/004613
§ 371 (c)(1),
(2) Date: Jul. 15, 2022

(87) PCT Pub. No.: WO2021/171989
PCT Pub. Date: Sep. 2, 2021

(65) Prior Publication Data
US 2023/0039788 A1    Feb. 9, 2023

(30) Foreign Application Priority Data
Feb. 28, 2020    (JP) .................................. 2020-034047

(51) Int. Cl.
*G06F 7/00*    (2006.01)
*B65G 1/137*    (2006.01)

(52) U.S. Cl.
CPC .................. *B65G 1/1371* (2013.01)

(58) Field of Classification Search
CPC ........ B65G 1/1371; B65G 1/137; B65G 1/00; B65G 2203/00; G05B 2219/40298;
(Continued)

(56) References Cited

U.S. PATENT DOCUMENTS 10,245,724 B2 *    4/2019    Ur ............................... G06T 7/75
2017/0320211 A1 *    11/2017    Akan ........................ G06F 8/34
(Continued)

FOREIGN PATENT DOCUMENTS

CA    3119943 A1 *    9/2020    .......... B65G 1/0464
CN    1310125    8/2001
(Continued)

OTHER PUBLICATIONS

"International Search Report (Form PCT/ISA/210) of PCT/JP2021/004613," mailed on Apr. 13, 2021, with English translation thereof, pp. 1-4.
(Continued)

*Primary Examiner* — Yolanda R Cumbess
(74) *Attorney, Agent, or Firm* — JCIPRNET (57) ABSTRACT

The present invention makes an instruction for causing a transport robot to carry out transport easier for a person to understand. A transport system (1) is such that an address indicating a transport destination or a transport source is represented by a tree structure including a node indicating loading locations and a node indicating equipment to which the loading locations are provided, and when the address of the transport destination indicates equipment, a transport robot (20) sequentially loads objects to be transported in accordance with a preset loading priority order in loading locations where no objects to be transported have been loaded, from among the loading locations belonging to that equipment.

8 Claims, 4 Drawing Sheets

(58) Field of Classification Search
CPC .......... G05B 2219/45063; G05B 15/00; G05B 2219/00; G05B 19/00; B25J 5/007; B25J 9/1679; B25J 13/006; B25J 5/00; B25J 9/162; B25J 9/1661; B25J 9/1664; B25J 11/008; B25J 9/00; B25J 11/00; B25J 13/00; Y02P 90/02; G05D 1/0282; G05D 1/0285; G05D 1/0287; G05D 1/0291; G05D 1/0297; G05D 3/00; G06Q 10/087
USPC .................. 700/213–216, 218, 228–229
See application file for complete search history.

(56) References Cited

U.S. PATENT DOCUMENTS

| | | | |
|---|---|---|---|
| 2018/0127212 A1 | 5/2018 | Jarvis et al. | |
| 2019/0188632 A1 | 6/2019 | Galluzzo et al. | |
| 2019/0346465 A1 | 11/2019 | Nagai et al. | |
| 2019/0389062 A1* | 12/2019 | Truebenbach | G05B 19/4155 |

FOREIGN PATENT DOCUMENTS

| | | | |
|---|---|---|---|
| CN | 110286673 | 9/2019 | |
| EP | 1122194 | 11/2004 | |
| JP | H10147411 | 6/1998 | |
| JP | 2014122075 | 7/2014 | |
| JP | 2015196600 | 11/2015 | |
| JP | 2016124706 | 7/2016 | |
| JP | 2019519097 | 7/2019 | |
| JP | 2019197021 | 11/2019 | |
| KR | 20180055809 | 5/2018 | |
| WO | WO-2015185628 A2 * | 12/2015 | ............. B60L 58/12 |

OTHER PUBLICATIONS

"Written Opinion of the International Searching Authority (Form PCT/ISA/237)" of PCT/JP2021/004613, mailed on Apr. 13, 2021, with English translation thereof, pp. 1-8.

"Office Action of China Counterpart Application", issued on Dec. 29, 2023, with English translation thereof, p. 1-019.

"Search Report of Europe Counterpart Application", issued on May 14, 2024, pp. 1-9.

"Notice of Non-Final Rejection of Korea Counterpart Application", issued on Jun. 18, 2024, with English translation thereof, pp. 1-10.

* cited by examiner

TRANSPORT SYSTEM AND TRANSPORT ROBOT

CROSS-REFERENCE TO RELATED APPLICATION

This application is a 371 application of the International PCT application serial no. PCT/JP2021/004613, filed on Feb. 8, 2021, which claims the priority benefits of Japan Patent Application No. 2020-034047, filed on Feb. 28, 2020. The entirety of each of the above-mentioned patent applications is hereby incorporated by reference herein and made a part of this specification.

TECHNICAL FIELD

The present invention relates to a transport system including a transport robot, and a transport robot.

RELATED ART

A self-propelled transport robot equipped with a robot arm (manipulator) to be used in factories, warehouses, etc. has been proposed (Patent Literature 1). Such a transport robot has a configuration in which an articulated robot arm is mounted on a travel device also called an automated guided vehicle (AGV). Such a transport robot automatically performs an operation of unloading a transported object (picking operation) and an operation of loading the transported object (placing operation) by the robot arm and moves by a travel robot, enabling unmanned transportation of the object to be transported.

CITATION LIST

Patent Literature

[Patent Literature 1] Japanese Patent Laid-Open No. 2019-519097

SUMMARY OF INVENTION

Technical Problem

To cause the transport robot to execute the required unloading operation and loading operation to realize the desired transportation, normally, it is necessary to give instructions for all the operations of the robot arm from the control device side that manages the transport robot. However, it is complicated to give instructions over such detailed operations, and it consumes the resources of the control device.

Moreover, the contents of such detailed instructions are esoteric to factory and warehouse managers and workers, and it is difficult to read the contents when monitoring the transport condition or when referring to the log of instructions for work confirmation or investigation, which causes a problem in system management. The present invention, on one aspect, has been made in view of such circumstances, and an object of the present invention is to realize a transport system in which instructions for executing transportation by a transport robot are in a mode that is easy for a person to understand.

Solution to Problem

The present invention adopts the following configuration in order to solve the above-mentioned problems.

The transport system according to one aspect of the present invention is a transport system for transporting, in an area where a plurality of pieces of equipment provided with a plurality of loading locations for loading an object to be transported is installed, the object to be transported between the loading locations across the plurality of pieces of equipment by a transport robot. The transport system includes: a control device having an instruction issuance unit that issues a transport instruction for the transport robot, and a database that holds inventory information of the loading location; and the transport robot. An address used in the transport instruction to specify a transport destination or a transport source is represented by a tree structure that includes a node indicating the locating location and a node indicating equipment provided with the locating location. When the address of the transport destination specified by the transport instruction indicates the equipment, the transport robot sequentially loads the object to be transported in accordance with a predetermined loading priority order in the loading location where the object to be transported has not been loaded, among the loading locations belonging to the equipment, based on the inventory information.

The transport robot according to one aspect of the present invention is a transport robot for transporting, in an area where a plurality of pieces of equipment provided with a plurality of loading locations for loading an object to be transported is installed, the object to be transported between the loading locations across the plurality of pieces of equipment in accordance with a transport instruction from a control device. The transport robot includes: an articulated robot arm that grips the object to be transported; an arm controller that controls an operation of the robot arm; an instruction acceptance unit that receives the transport instruction from the control device; a recording unit that holds a plurality of robot arm control programs for executing loading or unloading of the object to be transported to each of the plurality of loading locations of the equipment, and information of a loading priority order with respect to the plurality of loading locations of the equipment; and a selection unit that selects one from the plurality of robot arm control programs with reference to the transport instruction. An address used in the transport instruction to specify a transport destination or a transport source is represented by a tree structure that includes a node indicating the locating location and a node indicating equipment provided with the locating location. When the address of the transport destination or the transport source specified by the transport instruction indicates the equipment, the selection unit sequentially selects specific robot arm control programs based on inventory information of each of the loading locations belonging to the equipment and information of the loading priority order of each of the loading locations belonging to the equipment, and the arm controller controls the robot arm in accordance with the robot arm control programs sequentially selected.

Effects of Invention

According to the transport system or the transport robot according to one aspect of the present invention, it is possible to realize a transport system in which instructions for executing transportation by a transport robot are in a mode that is easy for a person to understand.

DESCRIPTION OF EMBODIMENTS

Embodiment

Hereinafter, an embodiment according to one aspect of the present invention (hereinafter also referred to as "the present embodiment") will be described with reference to the drawings.

1. Application Example

Figure 1:
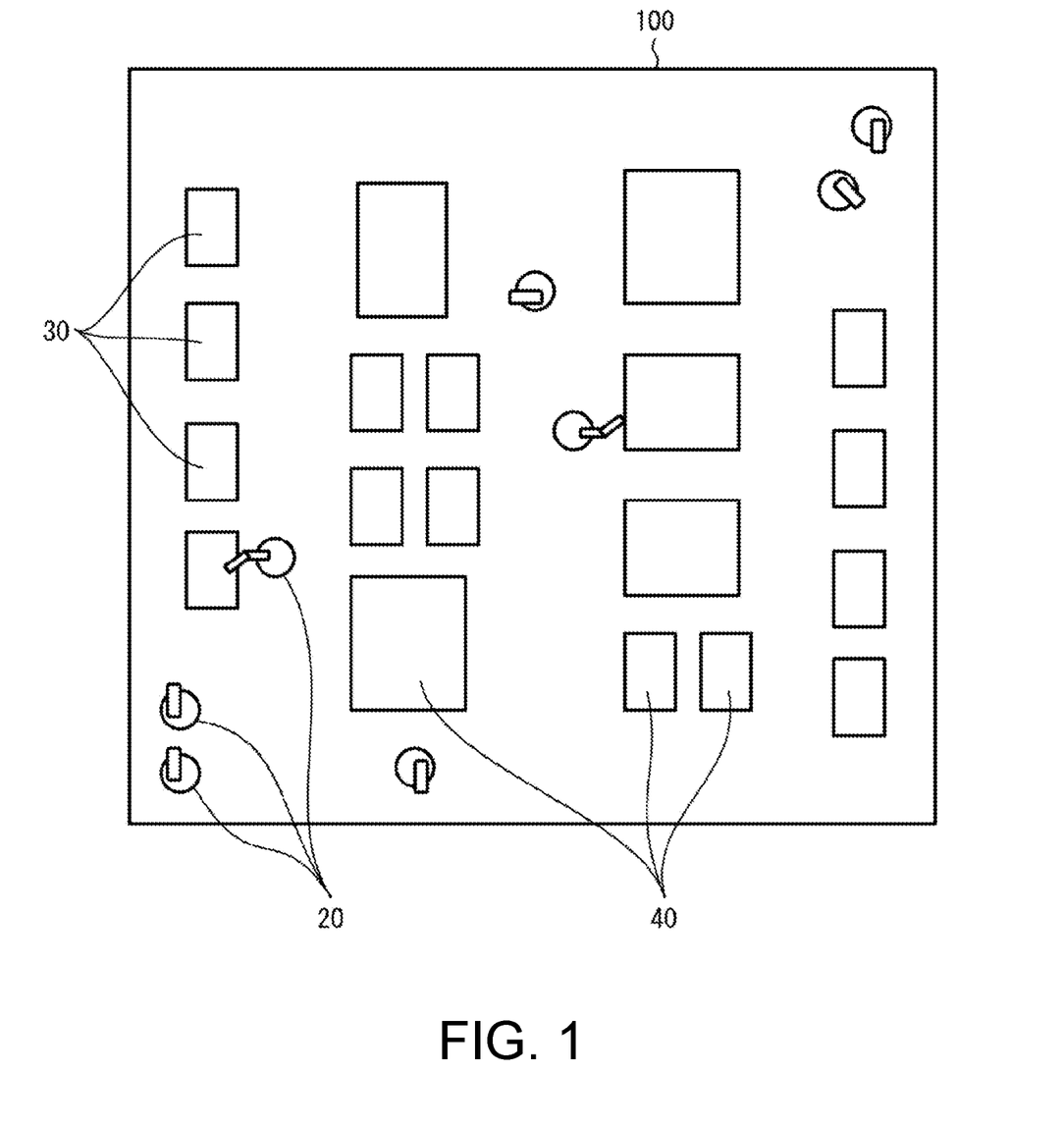
FIG. 1 is a floor map schematically showing an example of a factory to which a transport system according to an embodiment of the present invention is applied.

An example of a scenario to which the present invention is applied will be described with reference to FIG. 1. FIG. 1 is a diagram schematically showing a floor map of a factory 100, which is an example of an area such as a factory or a warehouse to which a transport system according to this application example can be applied.

The factory 100 is equipped with a transport robot 20 for transporting objects to be transported, such as products, semi-finished products, parts, tools, jigs, packing materials, and cassettes for storing these. The transport robot 20 is a self-propelled transport robot provided with a robot arm (manipulator) for gripping an object to be transported. The transport robot 20 is also provided with a travel mechanism for traveling.

A shelf 30 on which an object to be transported can be loaded is installed in the factory 100. Further, production equipment that applies required processing such as assembly, machining, assembling, and inspection to load an object to be transported in a predetermined pick-up port when loading the object to be transported in a predetermined receiving port is also installed in the factory 100. Depending on the production equipment, the receiving port and the pick-up port may be shared.

At least a plurality of pieces of equipment, among the shelves 30 and the production equipment 40, are provided with a plurality of loading locations in which the transport robot 20 loads an object to be transported. The transport robot 20 can transport an object to be transported between the loading locations across the equipment. Further, the transport system according to this application example includes a control device (not shown) in the floor map of FIG. 1. The control device has an instruction issuance unit that issues a transport instruction to the transport robot 20. In addition, the control device has a database that holds inventory information representing the inventory state of objects to be transported with respect to the loading location in each of the equipment.

In the transport system according to this application example, an address used in the transport instruction to specify the transport destination or the transport source is represented by a tree structure including a node indicating the loading location and a node indicating the equipment provided with the loading location. Then, when the address of the transport destination specified in the transport instruction indicates the equipment, the transport robot 20 operates as follows. The transport robot 20 loads the objects to be transported in the loading locations where no object to be transported has been loaded in accordance with a predetermined loading priority order, among the loading locations belonging to the equipment, based on the information held in the database.

In the transport system according to this application example, when the equipment at the transport destination has a plurality of loading locations, it is not always necessary for the control device to specify in which loading location the transported object is to be loaded in the instructions for executing the transportation by the transport robot. Therefore, the consumption of the resources of the control device is suppressed. Alternatively, it is possible to realize a transport system in which instructions for executing the transportation by the transport robot are in a mode that is easy for a person to understand. Therefore, management work such as monitoring, maintenance, and improvement of the transport system performed by the manager or worker can be carried out more easily.

2. Configuration Example

<Configuration of the Transport System>

Figure 2:
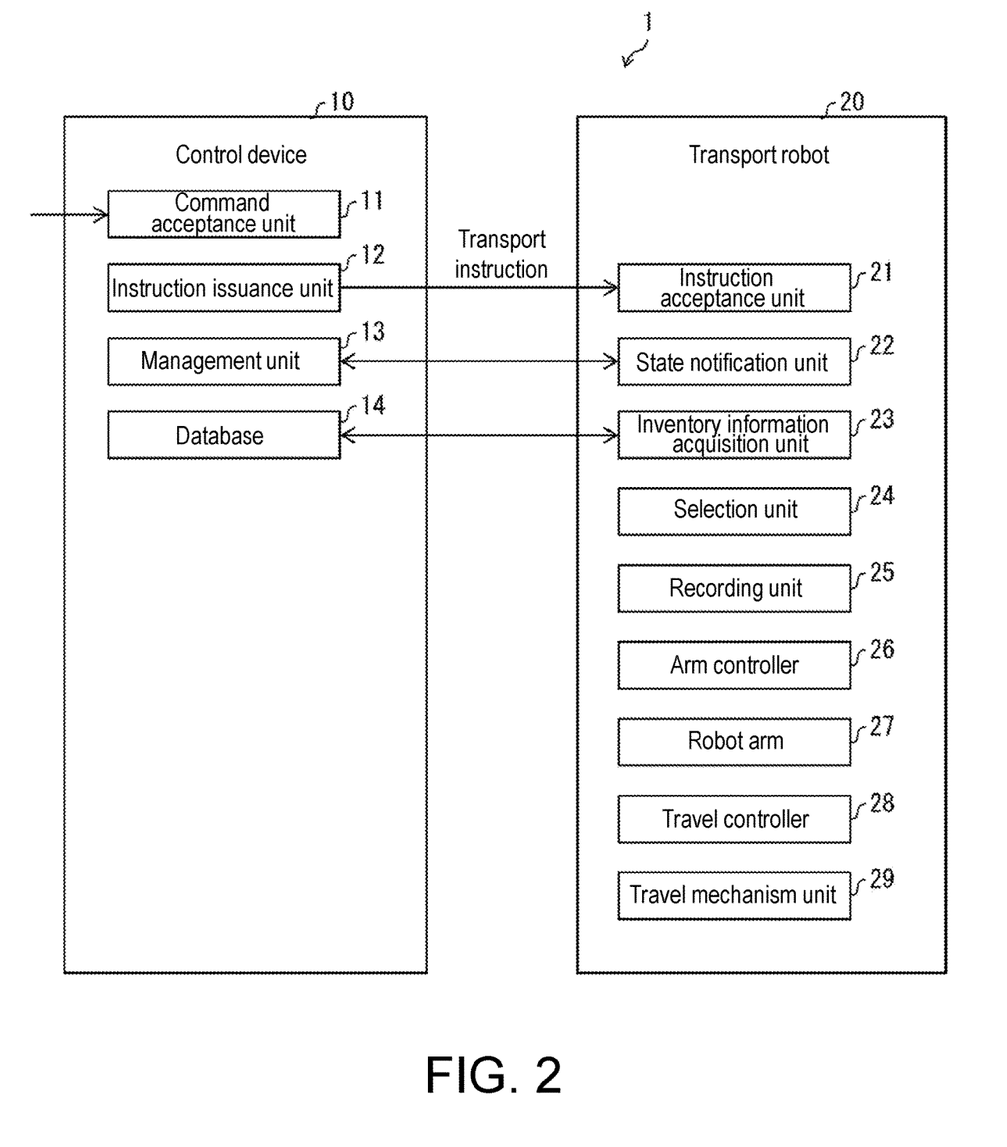
FIG. 2 is a block diagram showing a configuration of a transport system according to an embodiment of the present invention.

More specific configuration example and operation of the transport system will be described hereinafter. FIG. 2 is a block diagram showing a configuration of a transport system 1 according to this configuration example. The transport system 1 includes a control device 10 and a transport robot 20. In FIG. 2, one transport robot 20 is shown, but as shown in FIG. 1, usually a plurality of transport robots 20 are handled by the control device 10.

The control device 10 is an information processing system that manages transportation, which is sometimes called by a name such as a transport system server (AMHS server: Automated Material Handling System Server). The control device 10 transmits a more specific transport instruction to the transport robot 20 in the transport system 1 based on a command from a host information processing system or the like. The control device 10 may be an information processing system capable of executing such processing, and does not need to be a device physically contained in one housing.

When the scenario to which the transport system 1 is applied is a production factory, the host information processing system that manages the production of products in the production factory may be referred to as a manufacturing execution system server (MES server: Manufacturing Execution System Server). When the scenario to which the transport system 1 is applied is a distribution warehouse, the host information processing system that manages the receipt and delivery of stored items in the distribution warehouse may be referred to as a warehouse management system server (WMS server: Warehouse Management System Server). The command regarding transportation received by the control device 10 is not necessarily given by the host information processing system, and may be given by the manager or worker of a factory, warehouse, etc.

<Configuration of the Control Device>

As shown in FIG. 2, the control device 10 has a command acceptance unit 11, an instruction issuance unit 12, a management unit 13, and a database 14. The command acceptance unit 11 is a functional block that receives a command regarding transportation of an object to be transported from the host information processing system or the like. The instruction issuance unit 12 is a functional block that creates a transport instruction with respect to transportation of an object to be transported for each transport robot 20 in consideration of the state of the transport robot 20 to be managed, and transmits the transport instruction to each transport robot 20.

The management unit 13 is a functional block that monitors the state of the transport robot 20 to be managed and records the state in the database 14. The database 14 is a functional block that holds information regarding the functions and states of the transport robot 20, the shelf 30, and the production equipment 40, and the object to be transported. The database 14 holds inventory information indicating the inventory state in the loading locations of the shelf 30 and the production equipment 40 as one piece of such information.

<Configuration of the Transport Robot>

As shown in FIG. 2, the transport robot 20 has an instruction acceptance unit 21, a state notification unit 22, an inventory information acquisition unit 23, a selection unit 24, a recording unit 25, an arm controller 26, a robot arm 27, a travel controller 28, and a travel mechanism unit 29. The command acceptance unit 11 is a functional block that receives a transport instruction for the transport robot 20 from the control device 10.

The state notification unit 22 is a functional block that notifies the control device 10 of the state of the transport robot 20, for example, the current position, the state of holding the object to be transported, the state of operation, and the remaining battery level. The inventory information acquisition unit 23 is a functional block that acquires the inventory information by referring to the database 14 of the control device 10.

The selection unit 24 is a functional block that selects a robot arm control program for operating the robot arm 27. The recording unit 25 holds a plurality of robot arm control programs for executing loading or unloading of an object to be transported to each of a plurality of loading locations of the shelf 30 and the production equipment 40. Further, the recording unit 25 holds information of a loading priority order with respect to the plurality of loading locations on the shelf 30 and the production equipment 40.

The arm controller 26 is a functional block that controls the robot arm 27 to perform a required operation by executing the robot arm control program. The robot arm 27 is an articulated manipulator capable of gripping an object to be transported, loading an object to be transported to a loading location (placing operation), and unloading (picking operation). Further, the transport robot 20 is provided with a plurality of stages (shown in FIG. 4) for loading objects to be transported. The robot arm 27 can load an object to be transported on the stage and unload the object to be transported from the stage.

The travel controller 28 is a functional block that controls the travel mechanism unit 29 to move the transport robot 20 to a desired position. The travel mechanism unit 29 is a mechanism for the transport robot 20 to travel. The transport robot 20 can move an object to be transported within the floor of the factory 100 by traveling with the object to be transported loaded on the stage.

<Method of Specifying the Address>

Figure 3:
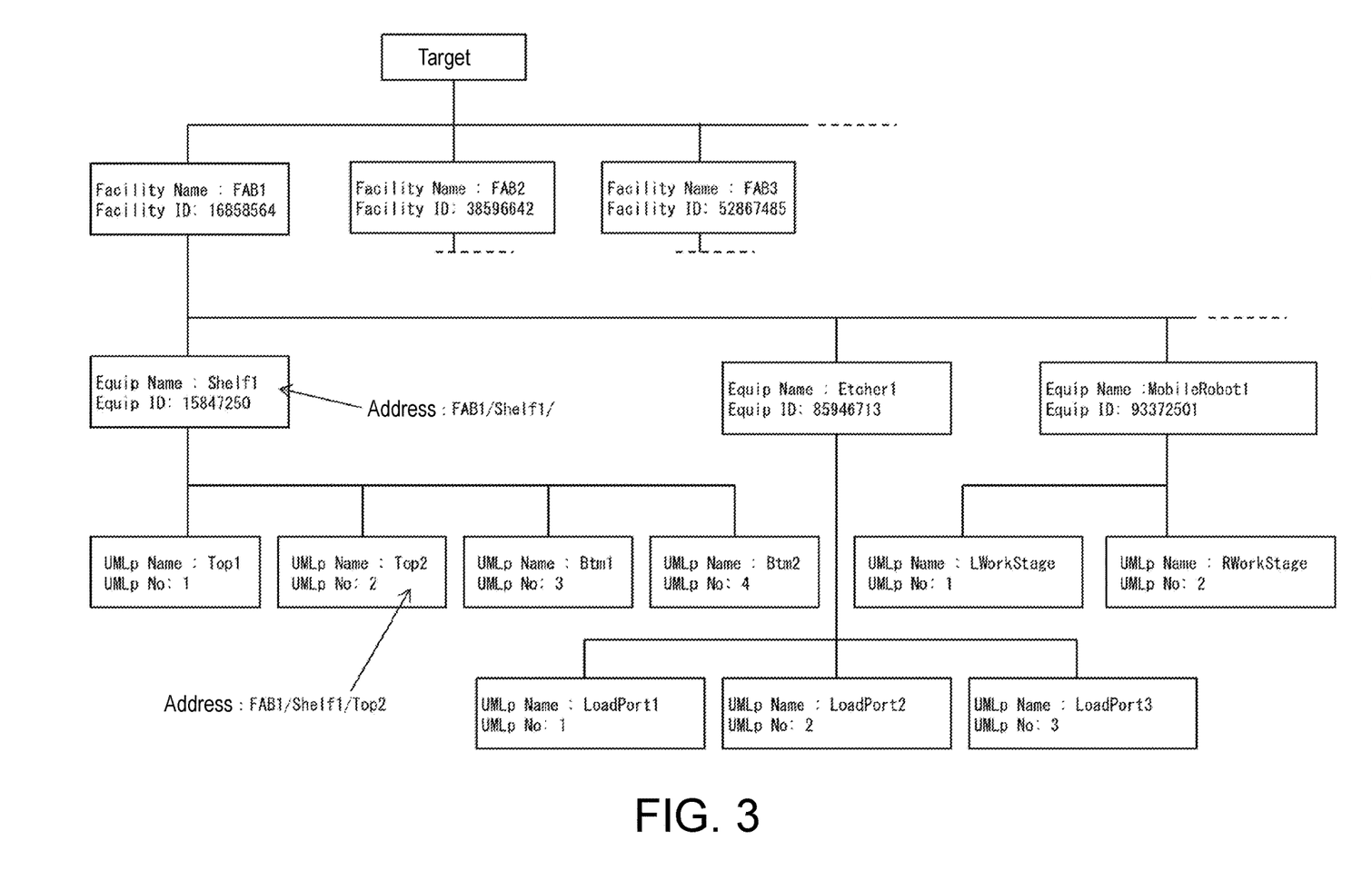
FIG. 3 is a diagram showing a method of configuring an address representing a transport destination or a transport source of an object to be transported in a transport system according to an embodiment of the present invention.

FIG. 3 is an explanatory diagram showing a method of configuring an address, which represents the transport destination or the transport source of an object to be transported in a transport instruction. As shown in the figure, the structure of these address groups constitutes a tree structure whose root is a set including all specified destinations that the transport system 1 takes as the target of the transport instruction. In FIG. 3, the root is displayed as "target."

The level next to the root is the first level indicating a certain region such as a factory or a warehouse. Here, as an example, the first level is named "Facility." In the example of FIG. 3, the nodes named "FAB1," "FAB2," and "FAB3" are shown as the nodes of the first level ("Facility" level). As shown in the figure, each node at the first level may be assigned an identification number (Facility ID).

The level next to the first level is the second level showing the equipment such as the shelf 30 and the production equipment 40, or the transport robot 20. Here, as an example, the second level is named "Equip." In the example of FIG. 3, the nodes named "Shelf1," "Etcher1," and "MobileRobot1" belonging to "FAB1" are shown as the node of the second level ("Equip" level).

As shown in the figure, each node at the second level may be assigned an identification number (Equip ID). Compared to the floor map of the factory 100 in FIG. 1, for example, the factory 100 corresponds to the node "FAB1," and the shelf 30, the production equipment 40, and the transport robot 20 in the factory 100 correspond to the nodes at the second level belonging to the node "FAB1" at the first level.

The level next to the second level is the third level showing the loading locations in the equipment such as the shelf 30 and the production equipment 40, and the stages in the transport robot 20. Here, as an example, the third level is named "UMLp" (Unique Motion Line Priority). "Shelf1" is an example of the node representing a specific shelf 30A of the shelves 30. The nodes named "Top1," "Top2," "Btm1," and "Btm2" are shown as the nodes at the third level ("UMLp" level) belonging to "Shelf1."

Figure 4:
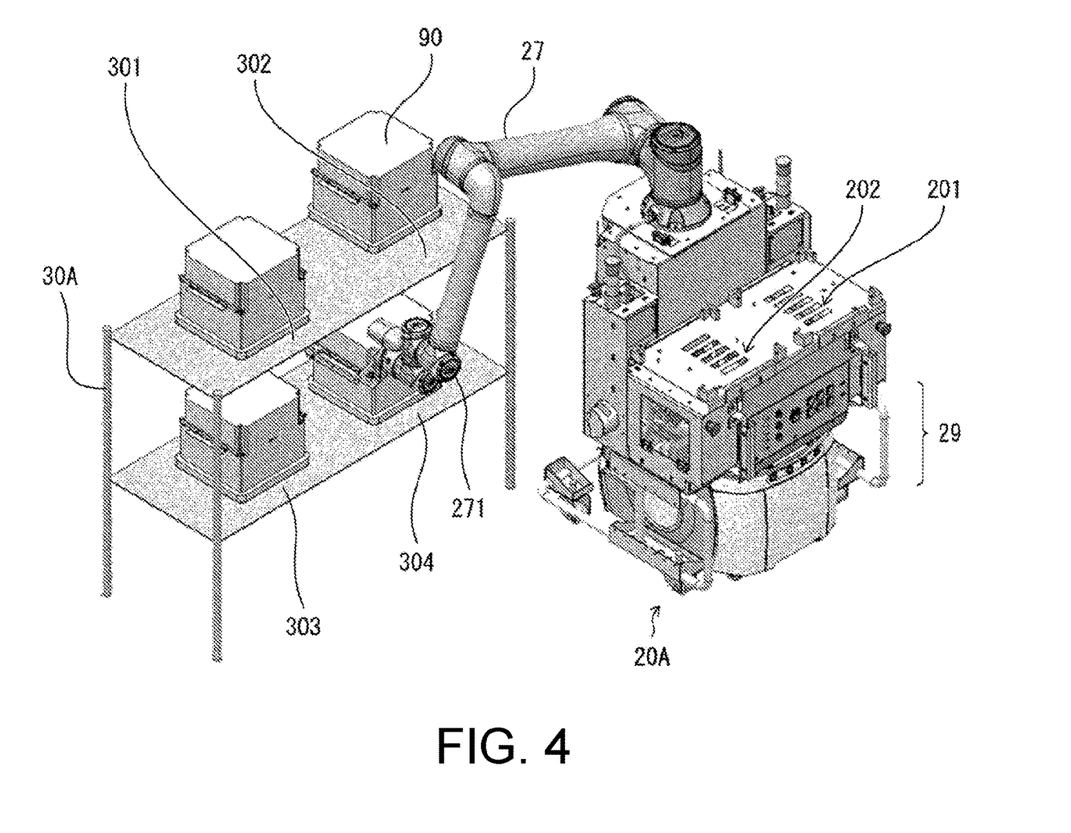
FIG. 4 is a diagram showing a situation where a transport robot executes loading of an object to be transported in a transport system according to an embodiment of the present invention.

FIG. 4 is a diagram showing a situation where a specific transport robot 20A indicated by the node "MobileRobot1" executes loading of an object to be transported 90 on the specific shelf 30A indicated by the node "Shelf1." In FIG. 4, the shelf 30A is provided with an upper shelf board and a lower shelf board. The upper shelf board has a loading location 301 indicated by the node "Top1" and a loading location 302 indicated by the node "Top2" in order. The lower shelf board has a loading location 303 indicated by the node "Btm1" and a loading location 304 indicated by the node "Btm2" in order.

A loading priority order is set for each loading location of the shelf 30A. Here, it is the order of the loading location 301, the loading location 302, the loading location 303, and the loading location 304, and is shown as "UMLp No" (Unique Motion Line Priority Number) in FIG. 3. The loading priority order ("UMLp No") also has a meaning as the identification number of the loading location on the shelf 30A, and the loading priority order does not overlap in the specific equipment.

The node "Etcher1" in FIG. 3 is the node indicating specific production equipment among the production equipment 40. Each node at the third level belonging to the node "Etcher1" indicates a loading location (receiving/pick-up port) of the production equipment, and is defined in the same manner as in the case of the node "Shelf1."

In FIG. 3, the nodes named "LWorkStage" and "RWorkStage" are shown as the nodes at the third level ("UMLp" level) belonging to the node "MobileRobot1" indicating the specific transport robot 20A. In FIG. 4, the transport robot 20A is provided with two stages, a left stage 201 and a right stage 202, which are for loading the object to be transported and correspond to the node "LWorkStage" and the node "RWorkStage," respectively.

A loading priority order is set for each stage of the transport robot 20A. Here, it is the order of the left stage 201 and the right stage 202, and is shown as "UMLp No" in FIG.

3 as in the case of the nodes at the third level belonging to "Shelf1." The loading priority order ("UMLp No") also has a meaning as the identification number of the loading location in the transport robot 20A, and is the same as in the case of the shelf 30A (node "Shelf1").

In the transport instruction in the transport system 1, the address indicating the shelf 30A is described by connecting the names of the nodes from the root side, such as "FAB1/Shelf1." Further, the address indicating the loading location 302 of the shelf 30A is described as "FAB1/Shelf1/Top2." By using such an address, it is possible to uniformly describe in the transport instruction whether to specify the loading location or the equipment as the transport destination or transport source. Furthermore, the transport instruction is easy for the manager or worker to understand.

<Transport Operation Example 1: Entrusted>

Various commands in the transport instruction are illustrated below. The description of each of these commands is an example, and even if the instruction of each operation is described by a command with a different name, the instruction does not change essentially. A command instructing the transport robot 20 to unload an object to be transported from a loading location of the shelf 30 or the production equipment 40 is described as "Boarding From." Next, a command instructing the object to be transported to be loaded on a stage of the transport robot 20 is described as "Boarding To."

A command instructing the transport robot 20 to unload the object to be transported loaded on the stage of the transport robot 20 is described as "Alighting From." Then, a command instructing the object to be transported to be loaded on a loading location of the shelf 30 or the production equipment 40 is described as "Alighting To."

A transport instruction for transporting an object to be transported to the shelf 31A (node "Shelf1") by the specific transport robot 20A (node "MobileRobot1") from a plurality of specific loading locations (node "LoadPort1," node "LoadPort2") of the specific production equipment (node "Etched") can be described, for example, as follows:

Boarding From: Fab1/Etcher1/LoadPort1,
  Fab1/Etcher1/LoadPort2
Boarding To: Fab1/MobileRobot1/
Alighting From: Fab1/MobileRobot1/
Alighting To: Fab1/Shelf1/
That's all.

In the transport operation example 1, when the object to be transported 90 is unloaded from the specific production equipment that is the transport source, individual loading locations ("Fab1/Etcher1/LoadPort1," "Fab1/Etcher1/LoadPort2") are specified, but an individual loading location is not specified for the transport destination shelf 31A, and the address "Fab1/Shelf1/" indicating the shelf 31A is specified. In this way, in the transport system 1, it is not necessary to give detailed instructions on which loading locations are to be loaded with the object to be transported 90 in order while confirming which loading locations are vacant on the shelf 31A.

A transport specifying method that specifies at the loading location level (third level) when specifying the transport source and specifies at the equipment level (second level) when specifying the transport destination is referred to as Entrusted designation. In the command "Boarding To" that loads the object to be transported 90 unloaded from the transport source on the stage of the transport robot 20A, and the command "Alighting From" that unloads the object to be transported 90 from the stage of the transport robot 20A, it is not necessary to specify individual loading locations, either. In these cases, the address "Fab1/MobileRobot1/" indicating the transport robot 20A can be specified.

As an example, when the transport robot 20A unloads the object to be transported 90 loaded on the stage of the transport robot 20A and loads it on the required loading location of the shelf 30A, the operation in the transport specifying method, which specifies at the equipment level (second level) when specifying the transport destination, will be described in detail below.

The command "Alighting From: Fab1/MobileRobot1/" is a command instructing to unload the object to be transported 90 loaded on the stage of the transport robot 20A. The command "Alighting To: Fab1/Shelf1/" is a command instructing to load the object to be transported 90 on the loading location of the shelf 30A then. Since it indicates that the transport robot 20A transports the object to be transported to the shelf 31A, the travel controller 28 controls the travel mechanism unit 29, and the transport robot 20A moves in front of the shelf 31A.

In the command "Alighting From: Fab1/MobileRobot1/," the stage (loading location) is not specified, and the address is only specified at the level up to the transport robot 20A at the second level. The selection unit 24 confirms whether or not the object to be transported 90 is loaded on the left stage 201 and the right stage 202, which are the loading locations of the transport robot 20A.

Then, since the objects to be transported 90 are loaded on both the left stage 201 ("UMLp No:1") and the right stage 202 ("UMLp No:2"), the selection unit 24 selects the right stage 202, which is a loading location with a lower loading priority order, based on the loading priority order information of the recording unit 25.

Information on whether or not the object to be transported 90 is loaded in the loading location of the transport robot 20A may be acquired by the inventory information acquisition unit 23 by inquiring the database 14 of the control device 10. Alternatively, the transport robot 20A may have sensors for detecting whether there is loading on each of the left stage 201 and the right stage 202 and acquire the information by these.

In the command "Alighting To: Fab1/Shelf1/," the loading location is not specified, and the address is only specified at the level of the shelf 30A at the second level. The selection unit 24 acquires information on whether or not the object to be transported 90 is loaded with respect to the loading location 301, the loading location 302, the loading location 303, and the loading location 304, which are the loading locations of the shelf 30A, from the database 14 of the control device 10 through the inventory information acquisition unit 23.

For example, it is assumed that the objects to be transported 90 are loaded in the loading location 301 ("UMLp No:1") and the loading location 302 ("UMLp No:2"), and the object to be transported 90 is not loaded in the loading location 303 ("UMLp No:3") and the loading location 304 ("UMLp No:4"). Then, the selection unit 24 selects the loading location 303, which is a loading location with a higher loading priority order, from the loading locations that are not loaded with the object to be transported 90 based on the loading priority order information of the recording unit 25.

Next, the selection unit 24 selects the robot arm control program for unloading the object to be transported 90 from the right stage 202 of the transport robot 20A and loading it in the loading location 303 of the shelf 30A, from the robot arm control programs recorded in the recording unit 25. When the arm controller 26 operates the robot arm according to the selected robot arm control program, movement of the object to be transported from the right stage 202 to the loading location 303 is carried out.

The selection unit 24 repeats the above operation as long as there are the objects to be transported 90 loaded in the loading locations of the transport robot 20A. Then, movement of the object to be transported 90 from the left stage 201 to the loading location 304 is carried out, and the movement of the objects to be transported 90 is completed.

The stage of the transport robot 20A has not been specified when the transport robot 20A unloads the object to be transported 90 loaded on the specific production equipment and loads it on the stage of the transport robot 20A, but the movement of the object to be transported 90 is executed sequentially based on the loading priority order from the stage not loaded with the object to be transported 90 in the same manner as described above.

<Transport Operation Example 2: Heap>

A transport instruction for transporting an object to be transported to the shelf 31A by the specific transport robot 20A (node "MobileRobot1") from the specific production equipment (node "Etcher1") can be described, for example, as follows:

Boarding From: Fab1/Etcher1/
Boarding To: Fab1/MobileRobot1/
Alighting From: Fab1/MobileRobot1/
Alighting To: Fab1/Shelf1/
That's all.

In the transport operation example 2, when the object to be transported 90 is unloaded from the specific production equipment that is the transport source, individual loading locations ("Fab1/Etcher1/LoadPort1," "Fab1/Etcher1/LoadPort2," etc.) are not specified, and the address "Fab1/Shelf1/" indicating the specific production equipment is specified. Further, for the transport destination, the address "Fab1/Shelf1/" indicating the shelf 31A is specified as in the transport operation example 1. In this way, in the transport system 1, it is not necessary to give detailed instructions on which loading locations are to be loaded with the object to be transported 90 in order while confirming whether there is loading in the loading locations at the transport source and the transport destination.

A transport specifying method that specifies at the loading location level (third level) when specifying the transport source and the transport destination and specifies at the equipment level (second level) when specifying the transport destination is referred to as Entrusted designation. When the transport robot 20A unloads the object to be transported 90 loaded on the specific production equipment, the robot arm control programs are sequentially selected to carry out unloading sequentially in the same manner as described above based on the inventory information regarding the specific production equipment and the loading priority order information.

As shown in transport operation example 1 and transport operation example 2, in the transport system 1, the addresses indicating the transport source and the transport destination are described in the instructions to the transport robot 20 by using nodes that constitute the tree structure. Therefore, it is easy for the manager or worker of a factory or warehouse to understand the contents of the instructions. Furthermore, even if the loading locations at the transport destination and the transport source, or the stages of the transport robot 20 are not specified one by one for the transport robot 20, the transport robot 20 appropriately executes the transportation according to the loading priority order.

Therefore, it is easy for the manager or worker of a factory or warehouse to read the contents when monitoring the transport condition or when referring to the log of transport instructions for work confirmation or investigation, and it becomes very easy to manage the transport system 1. Further, such processing is mainly realized by the transport robot 20. Therefore, distributed processing is realized without imposing an excessive burden on the control device 10 such as a transport system server.

[Example of Implementation by Software]

The functional blocks of the control device 10 (particularly, the command acceptance unit 11, the instruction issuance unit 12, and the management unit 13) or the functional blocks of the transport robot 20 (particularly, the instruction acceptance unit 21, the state notification unit 22, the inventory information acquisition unit 23, the selection unit 24, the arm controller 26, and the travel controller 28) may be realized by a logic circuit (hardware) formed in an integrated circuit (IC chip) or the like, or may be realized by software.

In the latter case, the control device 10 or the transport robot 20 includes a computer that executes instructions of a program that is software for realizing each function. The computer includes, for example, one or more processors and a computer-readable recording medium that stores the program. Then, in the computer, the processor reads the program from the recording medium and executes the program, thereby achieving the object of the present invention.

For example, a CPU (Central Processing Unit) can be used as the processor. A "non-temporary tangible medium," for example, a ROM (Read Only Memory) or the like, a tape, a disk, a card, a semiconductor memory, a programmable logic circuit, etc. can be used as the recording medium. Further, a RAM (Random Access Memory) for developing the program may be further included.

Furthermore, the program may be supplied to the computer via any transmission medium (communication network, broadcast wave, etc.) capable of transmitting the program. One aspect of the present invention can also be realized in the form of a data signal embedded in a carrier wave, in which the above program is embodied by electronic transmission.

SUMMARY

The transport system according to one aspect of the present invention is a transport system for transporting, in an area where a plurality of pieces of equipment provided with a plurality of loading locations for loading an object to be transported is installed, the object to be transported between the loading locations across the plurality of pieces of equipment by a transport robot. The transport system includes: a control device having an instruction issuance unit that issues a transport instruction for the transport robot, and a database that holds inventory information of the loading location; and the transport robot. An address used in the transport instruction to specify a transport destination or a transport source is represented by a tree structure that includes a node indicating the locating location and a node indicating equipment provided with the locating location. When the address of the transport destination specified by the transport instruction indicates the equipment, the transport robot sequentially loads the object to be transported in accordance with a predetermined loading priority order in the loading location where the object to be transported has not been loaded, among the loading locations belonging to the equipment, based on the inventory information.

According to the above configuration, it is possible to realize a transport system in which instructions for executing transportation by a transport robot are in a mode that is easy for a person to understand.

In the transport system according to the above one aspect, when the address of the transport source specified by the transport instruction indicates the equipment, the transport robot may unload the object to be transported in accordance with the predetermined loading priority order from the loading location where the object to be transported has been loaded, among the loading locations belonging to the equipment, based on the inventory information. According to the above configuration, it is possible to realize a transport system in which instructions for executing transportation by a transport robot are in a mode that is easy for a person to understand.

In the transport system according to the above one aspect, the transport robot may be provided with an articulated robot arm that grips the object to be transported. According to the above configuration, it is possible to realize a transport system that can flexibly handle various objects to be transported.

In the transport system according to the above one aspect, the transport robot may hold a plurality of robot arm control programs for executing loading or unloading of the object to be transported to each of the plurality of loading locations of the equipment, and information of the loading priority order with respect to the plurality of loading locations of the equipment. According to the above configuration, it is possible to realize a transport system that can execute distributed processing which can reduce consumption of the resources of the control device.

The transport robot according to one aspect of the present invention is a transport robot for transporting, in an area where a plurality of pieces of equipment provided with a plurality of loading locations for loading an object to be transported is installed, the object to be transported between the loading locations across the plurality of pieces of equipment in accordance with a transport instruction from a control device. The transport robot includes: an articulated robot arm that grips the object to be transported; an arm controller that controls an operation of the robot arm; an instruction acceptance unit that receives the transport instruction from the control device; a recording unit that holds a plurality of robot arm control programs for executing loading or unloading of the object to be transported to each of the plurality of loading locations of the equipment, and information of a loading priority order with respect to the plurality of loading locations of the equipment; and a selection unit that selects one from the plurality of robot arm control programs with reference to the transport instruction. An address used in the transport instruction to specify a transport destination or a transport source is represented by a tree structure that includes a node indicating the locating location and a node indicating equipment provided with the locating location. When the address of the transport destination or the transport source specified by the transport instruction indicates the equipment, the selection unit sequentially selects specific robot arm control programs based on inventory information of each of the loading locations belonging to the equipment and information of the loading priority order of each of the loading locations belonging to the equipment, and the arm controller controls the robot arm in accordance with the robot arm control programs sequentially selected.

According to the above configuration, it is possible to realize a transport system in which instructions for executing transportation by a transport robot are in a mode that is easy for a person to understand.

The present invention is not limited to the embodiments described above, and various modifications can be made within the scope of the claims. The technical scope of the present invention also includes embodiments obtained by appropriately combining the disclosed technical means.

What is claimed is:

1. A transport system for transporting, in an area where a plurality of pieces of equipment provided with a plurality of loading locations for loading an object to be transported is installed, the object to be transported between the loading locations across the plurality of pieces of equipment by a transport robot, the transport system comprising:

a control device having an instruction issuance unit that issues a transport instruction for the transport robot, and a database that holds inventory information of the loading location; and the transport robot, wherein an address used in the transport instruction to specify a transport destination or a transport source is represented by a tree structure that comprises a node indicating the locating location and a node indicating equipment provided with the locating location, and when the address of the transport destination specified by the transport instruction indicates the equipment, the transport robot sequentially loads the object to be transported in accordance with a predetermined loading priority order in the loading location where the object to be transported has not been loaded, among the loading locations belonging to the equipment, based on the inventory information.

2. The transport system according to claim 1, wherein when the address of the transport source specified by the transport instruction indicates the equipment, the transport robot unloads the object to be transported in accordance with the predetermined loading priority order from the loading location where the object to be transported has been loaded, among the loading locations belonging to the equipment, based on the inventory information.

3. The transport system according to claim 1, wherein the transport robot comprises an articulated robot arm that grips the object to be transported.

4. The transport system according to claim 1, wherein the transport robot holds a plurality of robot arm control programs for executing loading or unloading of the object to be transported to each of the plurality of loading locations of the equipment, and information of the loading priority order with respect to the plurality of loading locations of the equipment.

5. A transport robot for transporting, in an area where a plurality of pieces of equipment provided with a plurality of loading locations for loading an object to be transported is installed, the object to be transported between the loading locations across the plurality of pieces of equipment in accordance with a transport instruction from a control device, the transport robot comprising:

an articulated robot arm that grips the object to be transported;

an arm controller that controls an operation of the robot arm;

an instruction acceptance unit that receives the transport instruction from the control device;

a recording unit that holds a plurality of robot arm control programs for executing loading or unloading of the object to be transported to each of the plurality of loading locations of the equipment, and information of a loading priority order with respect to the plurality of loading locations of the equipment; and a selection unit that selects one from the plurality of robot arm control programs with reference to the transport instruction, wherein an address used in the transport instruction to specify a transport destination or a transport source is represented by a tree structure that comprises a node indicating the locating location and a node indicating equipment provided with the locating location, when the address of the transport destination or the transport source specified by the transport instruction indicates the equipment, the selection unit sequentially selects specific robot arm control programs based on inventory information of each of the loading locations belonging to the equipment and information of the loading priority order of each of the loading locations belonging to the equipment, and the arm controller controls the robot arm in accordance with the robot arm control programs sequentially selected.

6. The transport system according to claim 2, wherein the transport robot comprises an articulated robot arm that grips the object to be transported.

7. The transport system according to claim 2, wherein the transport robot holds a plurality of robot arm control programs for executing loading or unloading of the object to be transported to each of the plurality of loading locations of the equipment, and information of the loading priority order with respect to the plurality of loading locations of the equipment.

8. The transport system according to claim 3, wherein the transport robot holds a plurality of robot arm control programs for executing loading or unloading of the object to be transported to each of the plurality of loading locations of the equipment, and information of the loading priority order with respect to the plurality of loading locations of the equipment.

* * * * *